March 21, 1961 E. H. LYONS, JR 2,975,595
PRESSURE-OPERATED SYSTEMS WITH IGNITABLE PROPELLANTS
Filed Feb. 6, 1958 2 Sheets-Sheet 2

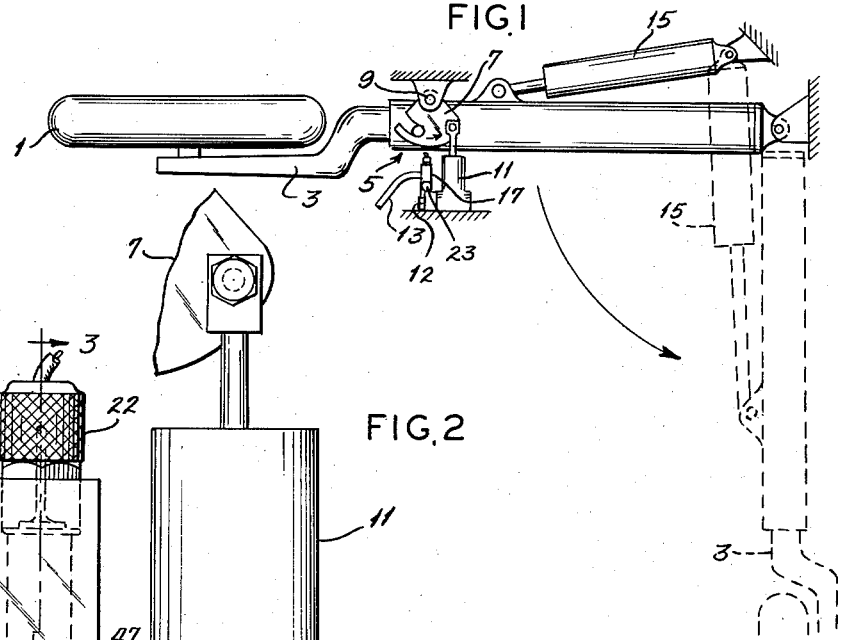
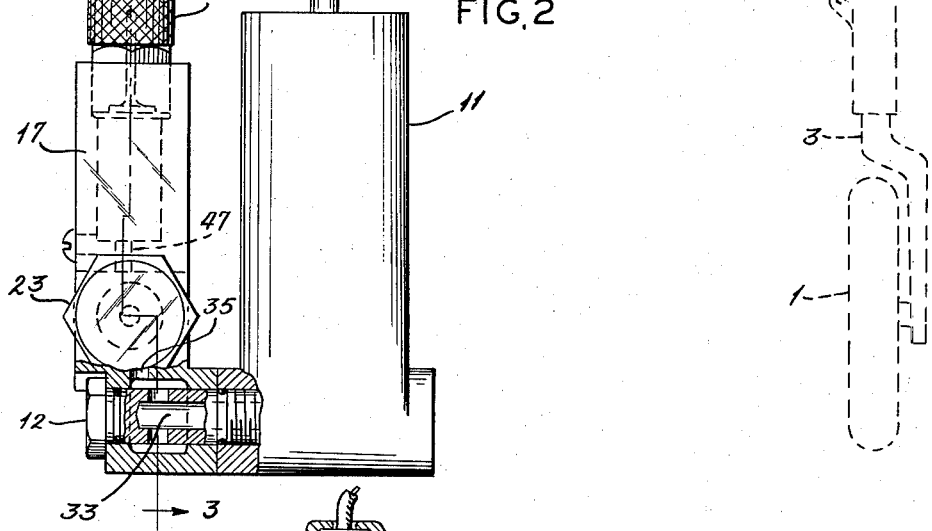
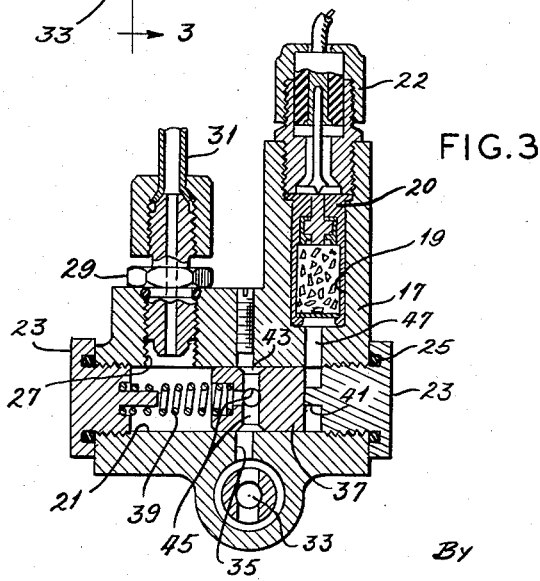
FIG.1
FIG.2
FIG.3
INVENTOR
ERNEST H. LYONS JR.
By Bruninga and Sutherland,
ATTORNEYS.

INVENTOR
ERNEST H. LYONS JR.
By Bruninga and Sutherland,
ATTORNEYS.

United States Patent Office 2,975,595
Patented Mar. 21, 1961

2,975,595

PRESSURE-OPERATED SYSTEMS WITH IGNITABLE PROPELLANTS

Ernest H. Lyons, Jr., Elsah, Ill., assignor to Chromalloy Corporation, Edwardsville, Ill., a corporation of New York Filed Feb. 6, 1958, Ser. No. 713,698

8 Claims. (Cl. 60—39.47)

This invention relates to hydraulic or pneumatic systems of the type wherein a pressurized fluid is intermittently utilized to operate some mechanical device, such as the landing gear of an aircraft or the brakes of a truck.

There have been some proposals for utilizing an ignitable propellant as an auxiliary source of pressure to employ when the regular pressure-supply system fails. The present disclosure is concerned with improvements over prior proposals. For example, one of the problems encountered is that of providing a propellant unit of the smallest size so that it can be incorporated into existing aircraft with little, if any, modifications thereof. Another problem is that of achieving foolproof operation, by avoiding the use of linkages and levers. Since the propellant device is generally connected into the regular pressure line of the system, there should also be some provision for isolating the propellant from the regular pressure fluid during normal operation and of isolating the normal pressure supply and associated lines from the propellant gases upon ignition of the unit.

Although other objects will be apparent in the following detailed description, briefly, the invention contemplates the provision of a small body formed with a first chamber for receiving the propellant and a second chamber containing a small shuttle or piston valve member movable between two positions. An inlet port for the second hydraulic system leads into the second chamber at one end thereof, whereas an outlet for the piston or pressure-operated device extends from another portion of the second chamber. In the first position of the valve member, the inlet port is in communication with the outlet port and the propellant is isolated from both ports. When the propellant is ignited, its gases drive the valve member to its second position, wherein the propellant chamber is then in communication with the outlet port and the inlet port is closed.

In some instances, the shuttle valve member may be spring biased to its first position, and this arrangement could permit re-use of the regular pressure system, even after ignition of the propellant. For example, if pressure were reapplied to the inlet port it may operate to move the valve member back to its first position. This would be particularly true if the propellant gases had cooled or had in part leaked from the system. If there were a substantial reduction of gas pressures, even the spring bias of the shuttle valve might be sufficient to return to its first position.

In some instances, however, it will be desirable to hold the piston or pressure-operated device in its actuated position, until such time as repairs can be made. This arrangement would be desirable for vehicle brakes or as a warning to replace the propellant, and is achieved by providing a locking dog within the body cooperable with the shuttle member. For example, a spring biased plug may be enclosed within the body by means of a removable cap and disposed so as to advance and lock the shuttle member when the latter moves to its second position.

Other features of the invention will be in part apparent from and in part pointed out in the following detailed description, taken in connection with the accompanying drawings, in which:

Fig. 1 is a diagrammatic view illustrating the invention applied to the "uplock" cylinder of the landing gear mechanism of an aircraft;

Fig. 2 is a detailed view of the apparatus illustrating the manner in which the device is connected directly to the cylinder unit so as to bypass the conventional hydraulic lines and achieve maximum reliability;

Fig. 3 is a cross sectional view taken on the line 3—3 of Fig. 2 illustrating details of the unit per se;

Fig. 4 is a cross sectional view illustrating an alternative embodiment of the invention, more particularly suited as an auxiliary safety device for truck brakes and the like;

Figure 4:
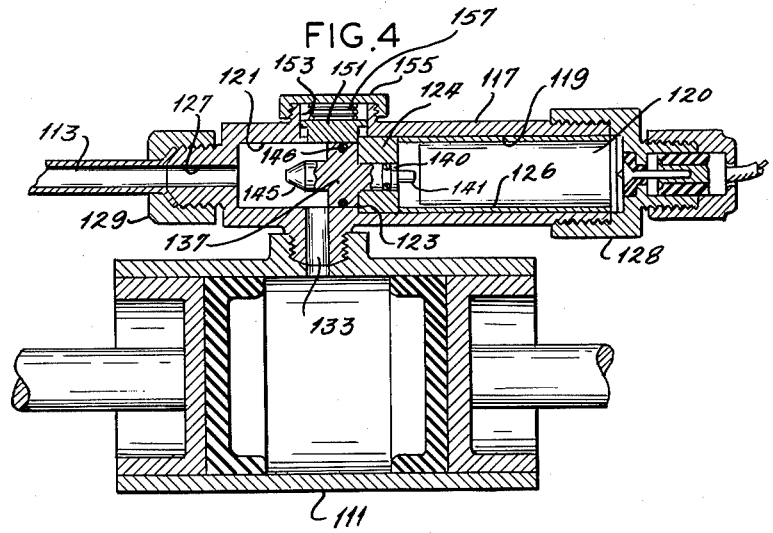

Referring now to the drawings, Fig. 1 is a diagrammatic view illustrating certain landing gear mechanism such as might be incorporated in an aircraft. The wheel 1 is journalled on a strut 3, and is normally held in a retracted position (shown in solid lines) by the locking device generally designated 5. The locking device comprises a cam plate 7 pivoted at 9 and adapted to be rotated by a piston-cylinder power unit 11 supplied from a pressure line 13. In lowering the landing gear to the dotted line position, the cam plate 7 is first rotated counterclockwise to unlock the strut 3, whereupon the strut 3 will generally drop under gravity to the dotted line position. The second hydraulic unit 15 is primarily for the purpose of raising the landing gear, although it can also be used to lower it.

The propellant pressure-supply unit of this invention more particularly shown in Figs. 2 and 3 is adapted to be secured directly against the power unit 11 by a bored bolt 12, thereby providing a maximum degree of safety in that the device will function even though the pressure line 13 is damaged. This unit comprises a body 17 formed with a propellant chamber 19 and a cross bore 21. The chamber 19 is adapted to receive a cartridge 20, preferably of a type adapted for electrical ignition. The firing elements are contained in the removable fitting 22, but since the details of the cartridge and ignition system will be understood by those skilled in this art, they are not described.

The bore 21 extends entirely through the body at right angles to the propellant chamber and is sealed at its ends by caps 23 and O rings 25. One end of this passage is formed with an inlet port 27 for receiving a fitting 29, which secures the regular pressure supply line 13. An outlet port 33 is formed at the bottom of the body to connect directly to the power unit 11 and communicates through a passage 35 with the bore 21.

A shuttle or piston-like member 37 is slidably received within the bore 21 and has a sufficiently close fit therewith to function as a valve member. The shuttle 37 is spring biased at 39 into a first position against a tip 41 formed on the cap 23. In this position, a channel 43 formed in the shuttle is aligned with the passage 35 and ports 45 in the shuttle then permit hydraulic fluid to flow from the line 13 to the outlet 33.

A second passage 47 is formed to extend from the cartridge chamber 19 into the passageway 21 at a point adjacent the tip 41 so that the propellant gases will operate against the shuttle 37. When the cartridge 20 is fired, the gases drive the shuttle 37 to its second position, wherein the right end of the shuttle is moved beyond the passage 35, so that the propellant gases may flow therethrough to the outlet 33. These gases necessarily operate the power unit 11, which rotates the locking plate 7 to release the landing gear.

It will be understood that the pressure of the propellant rises rapidly, but that after having actuated the cam plate, the pressure may drop off as the gases cool and leakage occurs. If the pressure drop is sufficient, the spring 39 will return the shuttle to its first position, as shown in Fig. 3. Even if the spring force is insufficient, a return of hydraulic fluid in the line 13 may be sufficient to move the shuttle back to its first position, hence this type of unit permits reuse of the regular pressure system, even after firing of the propellant cartridge.

Figure 5:
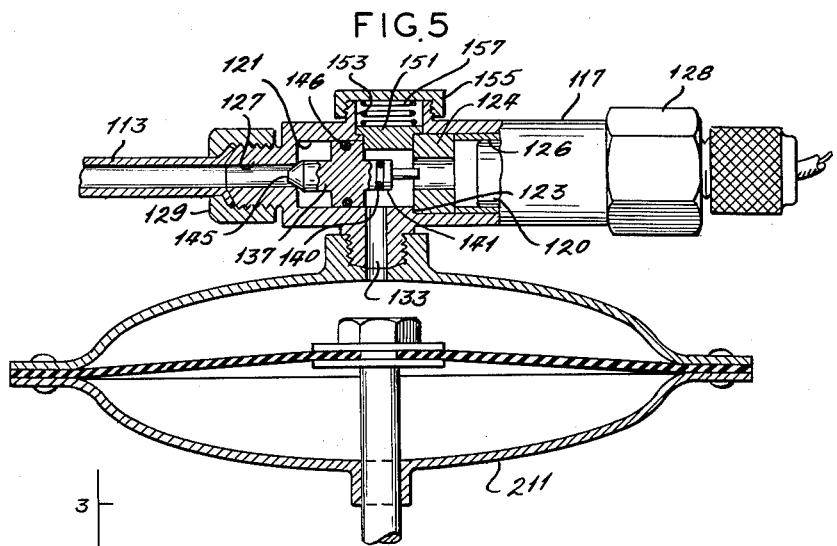
Fig. 5 is a view similar to that of Fig. 4 but illustrating the propellant unit per se in its actuated condition and with a different type of pressure-operated power unit.

Referring now to Figs. 4 and 5, there is shown an alternative embodiment of propellant unit, which effectively prevents reuse of the regular pressure system once the propellant is ignited. Fig. 4 illustrates a dual piston power unit 111, whereas Fig. 5 illustrates a diaphragm type of transducer 211, but it will be understood that various other power units can be utilized with the propellant unit. The propellant unit is the same in both figures.

A body 117 is formed with an elongate bore, the right-hand portion of which is a chamber 119 for a cartridge and the left-hand portion 121 of which contains a shuttle valve member 137. The regular pressure supply line 113 is connected to an inlet passage 127 at the left end of a body by means of a fitting 129. An outlet passage 133 then extends from the other end of the valve chamber 121. The two chambers 117 and 121 are defined by a shoulder 123 and collar 124 held against the shoulder by a sleeve 126. The sleeve is secured by the removable fitting 128, which contains the electrical firing device. The collar 124 receives a tip portion 141 of the shuttle and an O-ring seal 140 thereon forms a seal with the collar 124. A second O-ring 146 on the center portion of the shuttle then forms a seal with the wall of the valve chamber. A tapering tip 145 is formed at the other end of the shuttle to seat against the inlet port 127, when the shuttle is driven to its second position, as shown in Fig. 5.

In operation, the shuttle is initially in its retracted position of Fig. 4 (or would be driven into that position by the pressure from the regular supply line 113). Accordingly, the inlet port 127 is in communication with the outlet 133. In the event of failure of the regular pressure, the propellant in cartridge 120 may be ignited, for example, electrically, whereupon the shuttle is driven to its second position of Fig. 5, the propellant gases then flowing through the outlet 133 to the power unit.

This embodiment also has a locking element 151 in the form of a plug slidably received within a cross-bore 153 above the shuttle. A removable cap 155 closes the bore 153 and a spring 157 is interposed between the plug and cap. When the shuttle is in its normal position (Fig. 4), the plug 151 is held in a retracted position by engagement with the shuttle. When the propellant is ignited, however, the shuttle is forced to its second position and uncovers the plug 151 as well as the outlet port 133, whereupon the plug is spring biased downwardly, as shown in Fig. 5, to lock the shuttle against return movement. Accordingly, the regular pressure supply system is closed off from the power unit 211.

This arrangement might be desirable in hydraulic or pneumatic brakes, since the pressures of the propellant gases will hold the brakes actuated for at least a short time. Also, the inability to use the regular system serves as a warning that the propellant must be replaced or that something was wrong with the regular pressure supply system.

Figure 6:
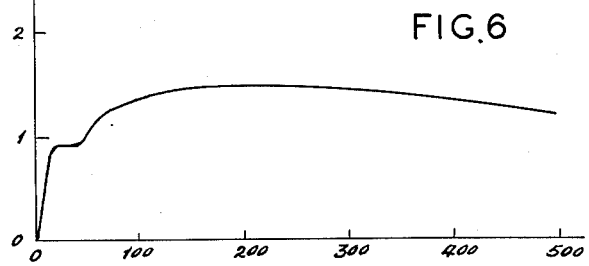
Fig. 6 is a pressure-time curve of the device shown in Fig. 1.

The propellant used in the devices disclosed above preferably has a characteristic such as to produce the pressure-time relationship illustrated in Fig. 6. In other words, the pressure should rise to about one thousand pounds per square inch rapidly, say in less than about ten microseconds. The pressure may then rise perhaps another five hundred pounds per square inch over the period of about one hundred milliseconds and should be sustained at around one hundred p.s.i. for a period of about five hundred milliseconds. Various types of propellants might be utilized and the following examples are given:

*Example 1*

A single base nitrocellulose propellant with multiple-size grains, some of which are perforated. The grains are cylindric ranging from .100 to .312 inch outside diameter and .312 to .100 inch in length. The distribution of the grain sizes is chosen to produce the pressure curve shown in Fig. 6. An adequate electric igniter would be lead styphanate, or a mixture of diazodinitrophenol, nitrostarch, and potassium chlorate with some finely divided single base powder to insure smooth and reliable ignition.

*Example 2*

Double base nitrocellulose propellant with multiple-size grains, some of which are perforated. These grains are cylindric ranging from .10 to .30 inch outside diameter and .1 to .3 inch in length or they may be cubes .1 to .3 inch on a side. Otherwise, the propellant is the same as in Example 1.

*Example 3*

Ammonium or potassium perchlorate base propellant with multiple-size grains, some of which are perforated, with dimensions the same as those in Example 2. The composition of this propellant is 70 to 80 percent ammonium or potassium perchlorate and 20 to 30 percent binder, such as polyvinyl chloride or other polymer. Otherwise, the propellant is the same as that given in Example 1.

*Example 4*

Ammonium nitrate base propellant, with multiple-size grains, some of which are perforated. These grains are cylindric ranging from .05 to .25 inch outside diameter and .10 to .30 inch in length or they may be cubes .05 to .25 inch on a side. Otherwise, this propellant is similar to that of Example 3.

From the foregoing description, it is apparent that those skilled in the art will understand the structure, function and mdoe of operation of the invention herein disclosed, and appreciate the advantages thereof. Although several embodiments have been disclosed in detail, it is to be understood that the invention is not limited thereto, but the drawings and description thereof are to be understood as being merely illustrative. It is realized that many modifications and variations will present themselves to those skilled in the art without departing from the spirit of this invention or the scope thereof as set forth in the appended claims.

Having thus described the invention, what is claimed and desired to be secured by Letters Patent is:

1. An auxiliary propellant unit for generating fluid pressure for emergency use as a supplementary power source adapted to be connected to a fluid pressure operated system having a fluid pressure supply means and a fluid pressure operated means, said auxiliary propellant unit comprising a unitary body formed with interconnected valve and cartridge chambers, inlet and outlet passages extending to and from said valve chamber adapted for connection respectively to the pressure supply and pressure operated power means, a piston-like shuttle valve member mounted for sliding sealing movement within said valve chamber from a first position adjacent said cartridge chamber wherein the outlet passage is in communication with said inlet passage to a second position adjacent the inlet passage wherein the inlet passage is closed thereby and the outlet passage is in communication with the cartridge chamber, means biasing said valve to said first position, means responsive to pressure from said cartridge chamber for moving said valve to said second position, and means associated with said cartridge chamber adapted to initiate pressure generation in said cartridge chamber.

2. Apparatus as set forth in claim 1, further including spring means biasing said valve member to its first position, said propellant chamber opening into said valve chamber on the side of said shuttle valve member opposite from that in which the inlet opens into the valve chamber, and said outlet passage leading from the valve chamber at a point intermediate the inlet passage and connection for the propellant chamber.

3. An auxiliary propellant unit for generating fluid pressure for emergency use as a supplementary power source adapted to be connected to a fluid pressure operated system having a fluid pressure supply means and a fluid pressure operated means, said auxiliary propellant unit comprising a unitary body formed with a bore defining a cylindrical valve chamber, a cartridge chamber interconnected with said valve chamber adjacent one end thereof, an inlet passage extending to said valve chamber adjacent the other end thereof, an outlet passage extending from said valve chamber intermediate said inlet passage and said cartridge chamber interconnection, a piston-like shuttle valve member mounted for sliding sealing movement within said valve chamber from a first position adjacent said cartridge chamber wherein the outlet passage is in communication with said inlet passage to a second position adjacent the inlet passage wherein the inlet passage is closed thereby and the outlet passage is in communication with the cartridge chamber, means biasing said valve to said first position, means responsive to pressure from said cartridge chamber for moving said valve to said second position, and means associated with said cartridge chamber adapted to initiate pressure generation in said cartridge chamber.

4. A propellant unit as set forth in claim 3, wherein said inlet passage extends through an end wall of said valve chamber, said valve member being formed with an opposed end portion adapted to seat in sealing relationship with said inlet passage upon movement of the valve member toward said inlet passage.

5. A propellant unit as set forth in claim 3, further including locking means mounted in said body section to lock the valve member against return movement when the valve member moves toward said inlet passage.

6. An auxiliary propellant unit for generating fluid pressure for emergency use as a supplementary power source adapted to be connected to a fluid pressure operated system having a fluid pressure supply means and a fluid pressure operated means, said auxiliary propellant unit comprising a unitary body formed with interconnected valve and cartridge chambers, said cartridge chamber being adapted to contain an ignitable propellant, inlet and outlet passages extending to and from said valve chamber adapted for connection respectively to the pressure supply and pressure operated power means, a piston-like shuttle valve member mounted for sliding sealing movement within said valve chamber from a first position adjacent said cartridge chamber wherein the outlet passage is in communication with said inlet passage to a second position adjacent the inlet passage wherein the inlet passage is closed thereby and the outlet passage is in communication with the cartridge chamber, means biasing said valve to said first position, means responsive to pressure generated by ignition of the ignitable propellant for moving said valve to said second position, means associated with said cartridge chamber adapted to initiate pressure generation by the ignitable propellant, and means for locking said valve member in said second position.

7. Apparatus as set forth in claim 6, wherein said locking means is constituted by a spring biased locking dog movable from a retracted to an advanced position, said dog being held in its retracted position by engagement with the valve member when the valve member is in its first position, and means biasing said dog to its advanced position as the valve member moves beyond the dog to its second position.

8. The combination as defined in claim 6 in which pressure for operating said valve and said unit is derived from an ignitable propellant with multiple-size grains of explosive material such as to produce a quick pressure rise to about a thousand pounds per square inch and to sustain that pressure over a relatively longer period of several hundred milliseconds.

References Cited in the file of this patent
UNITED STATES PATENTS

| | | |
|---|---|---|
| 1,444,984 | Simmon | Feb. 13, 1923 |
| 2,186,235 | Brown | Jan. 9, 1940 |
| 2,300,694 | Overbeke | Nov. 3, 1942 |
| 2,312,686 | Campbell | Mar. 2, 1943 |
| 2,358,228 | Hoof | Sept. 12, 1944 |
| 2,695,365 | McLean | Nov. 23, 1954 |
| 2,743,576 | Crockett | May 1, 1956 |